United States Patent [19]

Rezmer

[11] Patent Number: 4,594,786
[45] Date of Patent: Jun. 17, 1986

[54] BOW SQUARE

[75] Inventor: Leonard D. Rezmer, Kawkaw, Mich.

[73] Assignee: The Game Tracker, Inc., Flushing, Mich.

[21] Appl. No.: 676,487

[22] Filed: Nov. 29, 1984

[51] Int. Cl.$^4$ ................................................ G01B 3/30
[52] U.S. Cl. ...................................... 33/180 R; 33/265
[58] Field of Search .............. 33/180 R, 265; 124/87, 124/90, 91

[56] References Cited

U.S. PATENT DOCUMENTS

| | | | |
|---|---|---|---|
| 1,742,595 | 1/1930 | Hoevel . | |
| 2,052,452 | 8/1936 | De Jarnette | 33/174 |
| 2,203,992 | 6/1940 | Lutz | 33/189 |
| 2,974,416 | 3/1961 | Zurcher | 33/27 |
| 3,038,262 | 6/1962 | Fuehrer et al. | 33/180 |
| 3,088,212 | 5/1963 | Smith | 33/180 |
| 3,111,772 | 11/1963 | Hartog | 33/180 |
| 3,151,401 | 10/1964 | Bender | 33/189 |
| 3,289,307 | 12/1966 | Kelly | 33/143 |
| 3,418,718 | 12/1968 | Current et al. | 33/46 |
| 3,449,052 | 6/1969 | Rankin | 356/170 |
| 3,542,159 | 11/1970 | Kestermeier et al. | 188/72.6 |
| 3,600,814 | 8/1971 | Smith | 33/180 R |
| 3,651,570 | 3/1972 | Groves | 30/233 |
| 3,969,825 | 7/1976 | Mathes | 33/180 R |

Primary Examiner—Willis Little
Attorney, Agent, or Firm—Basile Weintraub Hanlon

[57] ABSTRACT

A bow square 10 is defined by a T-shaped planar member 12 having calibrations 18 along the length of each leg 14,16 on each face thereof. The bow square 10 includes a slidably adjustable gauge 22 which is mounted on one leg for enabling proper location of a nocking point, a kisser button and/or peepsight. Leaf spring clip mounts 24 enable multi-positioning of the bow square 10 onto a bow string 52.

6 Claims, 5 Drawing Figures

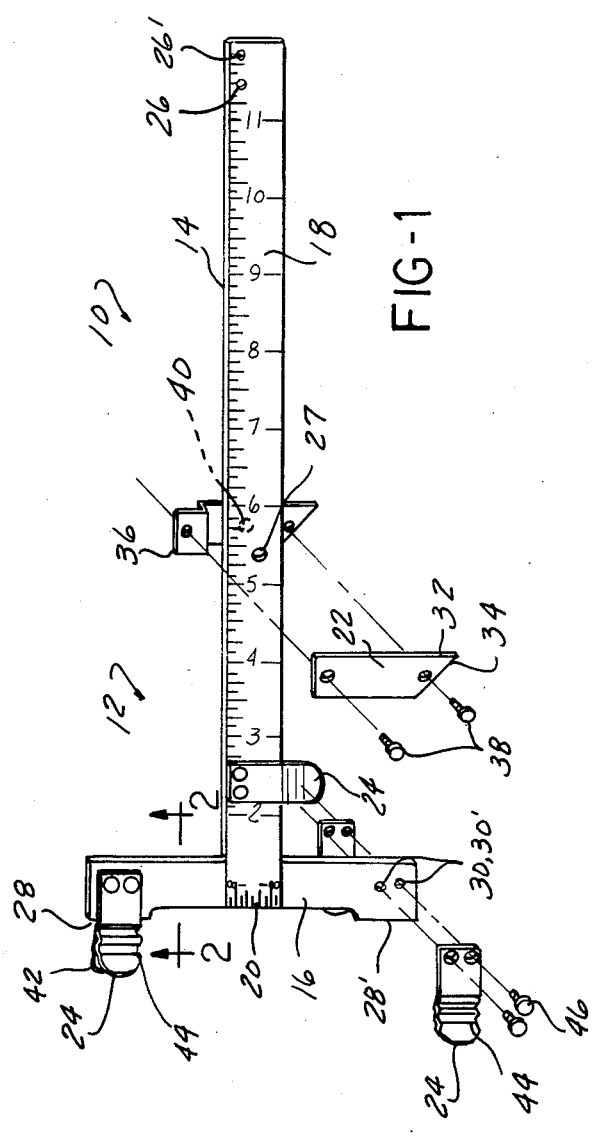
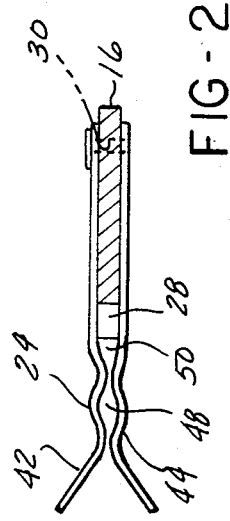

BOW SQUARE

BACKGROUND OF THE INVENTION

1. Field of the Invention

The present invention relates to archery. More particularly, the present invention concerns means for mounting accessories to an archery bow. Even more particularly, the present invention concerns devices for enabling proper positioning of nocking points and determining the bracing height, as well as for peepsight and/or kisser button location, for archery bows.

2. Prior Art

In archery the accuracy obtained in placing the arrow on target depends to a great extent on proper stringing of the bow, with the correct measurement for the particular bow being maintained between the back of the bow handle and the string and with proper locating of the nocking points on the bow string, the foregoing measurement or distance being generally referred to in the sport as "bracing heights" or "fistmele" and normally being maintained within a range of seven to eight and one-quarter inches. The "nocking point" are fixed members on the bow string on which the arrow is placed so that each arrow is shot from the same position on the string. The proper locating of these points is highly important for consistent and accurate shooting of the arrows.

The nocking point, as noted, is a preselected and identifiable position on an archer's bow string against which an arrow is placed so as to propel the same accurately and consistently every time the arrow is fired. It is highly important that the precise position of the nocking point be located for each arrow to be fired from the bow. Moreover, different arrows, particularly those having different diameters, have slightly different nocking point positions on the bow string of a given bow.

In contemporary archery, particularly in competitive target archery, the archer normally uses a bow sight and a definite anchor point on his face in order to obtain maximum accuracy and consistency in hitting the target with the arrow. The sights, which are mounted on the bow, usually slightly above the arrow rest, are of little value unless the fixed anchor point is consistently used, and various practices and devices have been used to assist the archer in using the precise anchor point. One of these devices is referred to as a kisser button, which is normally a small disc-shaped member adapted to be clamped onto the bowstring at the position corresponding to the archer's mouth, and when the archer draws his bow, the bow string are so positioned that the button rests between the lips with the mouth closed. Thus the closed lips, in conjunction with the kisser button, form a definite anchor point which permits the archer to consistently draw the bow and aim the arrows.

After the button has been properly located on the string, it becomes a fixed point on the string which is used constantly by the archer and, whenever a new string is used in the bow, the archer endeavors to locate the button in the corresponding position on the new string, with respect to the nocking point on the new string.

More recently, and as bow sights have become more sophisticated, a peepsight has been used which permits the archer to obtain maximum accuracy time after time with the same bow and sight settings. The peepsight is attached to the string usually by separating the strands and securing the sight between the strands in a fixed position. When the nocking point, kisser button and peepsight have been properly positioned, consistent accuracy in shooting is easily achieved so long as the points are maintained in their proper positions. However, as the bow is used, there is a tendency for the string to stretch and/or for the kisser button or peepsight to slip, thus, rendering the setting of those elements inaccurate and resulting in inaccurate shooting.

The prior art has devised many devices to facilitate the mounting of nocking points and to determine the proper bracing height for an archery bow, as well as kisser button and peepsight location. See, inter alia, U.S. Pat. Nos. 3,088,212; 3,038,262; 3,969,825; as well as U.S. Pat. Nos. 3,111,722 and 3,600,814.

Yet, these prior art devices fail to provide the combined ability of nocking point placement enablement and bracing height determination. Likewise, the prior art devices fail to provide sufficient "working" space for nocking point mounting and, likewise, fail to provide sufficient "working" space when other accessories are mounted on the bow. As will subsequently be detailed the present invention overcomes these deficiencies in the prior art.

SUMMARY OF THE INVENTION

The present invention provides a bow square which enables proper positioning of a kisser button, peepsight and nocking point, as well as enabling proper determination of the bracing height of an archery bow. The present device, generally, comprises a T-shaped member having first and second legs which are normal to each other. Each leg is provided with a series of calibrations or demarcations to enable proper measurements. Associated with one leg of the T-shaped member is a sliding gauge for locating a kisser button and a peepsight.

A spring clip is located proximate the terminus of each leg. The spring clips are each provided with dual, spaced apart openings, for multi-positioning of the bow string, with respect to the device, to provide sufficient working area, when needed, between the bow square, per se, and the bow string.

For a more complete understanding of the present invention reference is made to the following detailed description and accompanying drawing. In the drawing like reference characters refer to like parts throughout the several views, in which:

BRIEF DESCRIPTION OF THE DRAWING

FIG. 1 is a plan view, partly explained showing a bow square in accordance with the present invention;

FIG. 2 is a cross-sectional view taken along line 2—2 of FIG. 1;

DESCRIPTON OF THE PREFERRED EMBODIMENT

Figure 5:
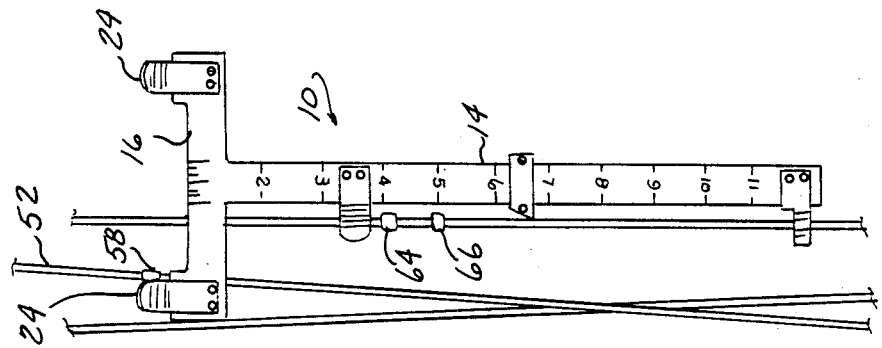
FIG. 5 is a plan view illustrating the use of the present invention in locating a kisser button and peepsight.
Figure 3:
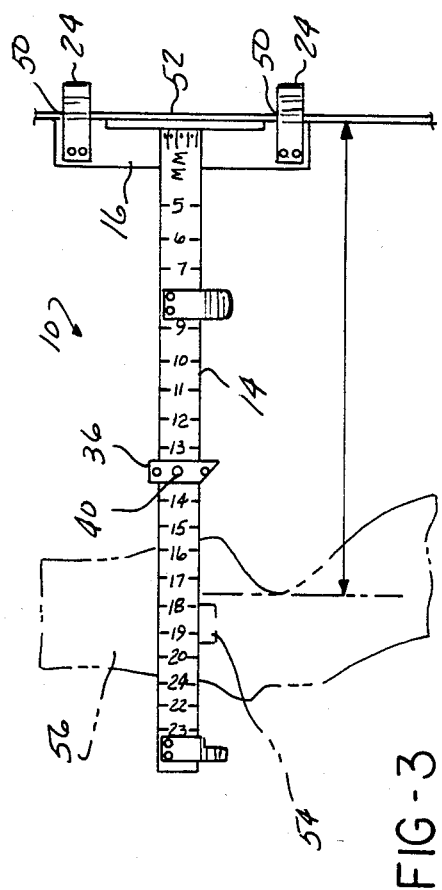
FIG. 3 is a partial, perspective view showing the use of the present invention in determining bracing height.
Figure 4:
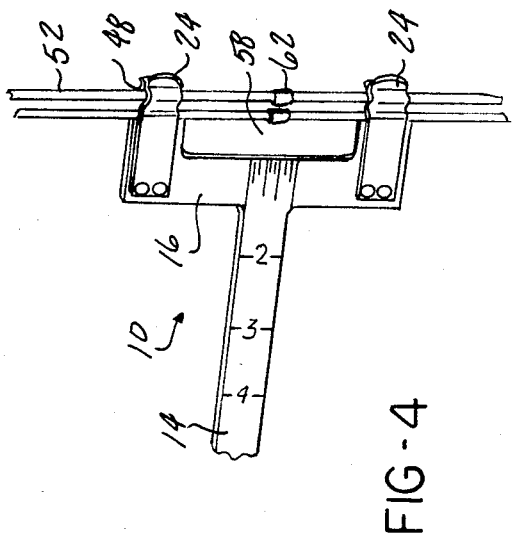
FIG. 4 is a partial, perspective view showing the use of the present invention in locating a nocking point.

Now, and with reference to the drawing, there is depicted therein a bow square 10 in accordance with the present invention. The bow square 10, generally, comprises a T-shaped flat planar member 12 having a first leg 14 and second leg 16 which is normal to the first leg 14.

For purposes of clarity the first leg 14 will be defined as a "long" leg and the second leg will be defined as a "short" leg.

In accordance herewith the long leg 14 is employed to determine bracing height, and kisser button and/or peepsight location. The short leg 16 is employed for locating the nocking point position, in a manner to be described subsequently.

Each leg 14, 16 is provided with a series of calibrations or demarcations 18, 20, respectively, or measuring proper locations.

A sliding gauge 22 is slidably mounted on the leg 14. The gauge 22 is employed to locate the proper distance between a nocking point and a kisser button and/or peepsight as well as to maintain a proper distance between a kisser button and a peepsight.

A spring clip 24 is located proximate the terminus of each leg 14,16 for detachably mounting a bow string to the bow square 10.

With more particularity, the flat planar member 12 is formed from any suitable material such as steel, plastic or the like.

The long leg 14 is an elongated leg having at least one aperture 26,26' located proximate each terminus thereof. The apertures 26,26' are employed to mount an associated spring clip 24 thereto. The leg 14 is, also, provided with a central aperture 28 which provides a central rest or seat for the sliding gauge 22.

The short leg 16, which is normal to the leg 14 is provided with a mounting flange 28,28' at each end thereof. Each mounting flange 28,28' has a spring clip 24 mounted thereonto. At least one aperture 30,30' is located on each flange 28,28' for mounting the associated clip 24 thereto.

As hereinbefore noted, a series of calibrations or demarcations 18,20 is provided on each leg 14,16, respectively. Preferably, each side of each leg is calibrated. In the preferred embodiment hereof, a first side or face of each leg of the member 12 has a first series of calibrations in a first measuring unit, such as inches. The second or opposite side or face of each leg of the member is calibrated in a second measuring unit, such as millimeters.

The long leg 14 is calibrated substantially along the entire length or extent thereof.

The short leg is calibrated in the central portion thereof corresponding to the width of the long leg, as shown.

As hereinbefore noted, slidably secured to the long leg 14 is a guage 22. The guage 22 comprises a first plate 32 which is tangential to a first side of the leg and has a width greater than the leg 14, as shown. The plate 32 terminates in a pointer 34 which is used to properly locate distances along the length of a bow string for kisser button and/or peepsight location.

The gauge 22, further, comprises a second plate 36 tangential to the opposite side of the leg 14, as shown. The two plates 32 and 36 are interconnected via any suitable fastening means, such as rivets 38 or the like. The plates frictionally engage the leg 14 therearound to hold the gauge in any position therealong. The gauge is manually slidable therealong by overcoming the frictional force.

The plate 36 is provided with a dimple 40 which seats within the central aperture 28 to provide a seating for the gauge.

As hereinabove indicated, the bow square 10 is detachably mounted to a bow string via mounting clips 24. Since each clip 24 is constructed similarly, only one such clip will be described for purposes of brevity.

Each clip 24 comprises a pair of leaf spring 42,44. The leaf springs are secured one to each side of an associated side of a leg of the member 12 via a fastening means, such as a rivet 46 which projects with an associated mounting aperture 26,26', 30 or 30'.

Each leaf spring 42,44 is crimped to define a pair of spaced apart openings 48,50 therebetween. The openings 48,50 are parallel. The openings releasably retain a bow string therewithin and enable multipositioning of the bow square 10 relative to a bow string.

In use the present device is used as follows for the respective functions:

BRACING HEIGHT

As shown in the drawing, the bow square is secured to a bow string 52 via the clips 24 associated with the leg 16. The string is mounted into the openings 50 closest to the flanges 28,28'. The leg 14 rests lightly on an arrow rest 54 associated with a handle 56 of a bow. Then, an imaginary line (in phantom) is drawn from the calibration line which extends down to and is tangential to the inside curve of the handle 56. The distance between this calibration line and the bow string 52 is the bracing height.

NOCKING POINT

To set the nocking point 62, the short leg 16 is secured to the string 52 at the first opening 48 to provide a working area 58 between the leg 16 and the string 52. In setting the nock point the long leg 14 is rested on the arrow rest 54 such that the projection line 60 parallel to the bottom edge of the long leg, formed in the short leg 16 is even with the arrow rest 54. This "squares" the bow handle with the string. Then, the nock point 62 is set, as desired, upwardly therefrom, and a nocking point 62 is, then, secured to the string 52.

KISSER BUTTON AND PEEPSIGHT

As shown in the drawing, a kisser button 64 and peepsight 66 are mounted onto the bow string after the nocking point 62 is secured thereto. The long leg 14 is secured to the bow string via the clips 24 with one clip seated just below the nocking point 62. The gauge 22 is the slid along the leg 14 to the appropriate point(s) for securing the kisser button 64 and/or peepsight 66 in a manner well-known to the skilled artisan. Thus, the member 12 can be used to check the proper positioning or to assist in setting the kisser button and/or peepsight onto the string 52 during a re-stringing operation, without the need for removing any other accessories.

It is to be appreciated from the preceding that there has been described a multi-functional bow square.

Having, thus, described the invention, what is claimed is:

1. A bow square for determining the bracing height of a bow string and for facilitating the proper positioning of a nocking point, kisser button and peepsight, which comprises:
   (a) a T-shaped flat planar member having a first leg and a second leg, the legs being normal to each other;
   (b) a plurality of calibration lines disposed along each leg;

(c) a gauge mounted on one leg and being slidably positionable therealong, the cause being retained in place by frictional engagement with said leg; and (d) means for detachably engaging a bow string mounted onto each leg having a plurality of spaced openings, each providing a different bow string setting.

2. The bow square of claim 1 wherein:

each leg has a plurality of calibrations on each side face thereof, the calibrations on a first side face being in a first measuring unit and the calibrations on the opposite face being in a different measuring unit.

3. The bow square of claim 1 wherein:

the means for detachably engaging comprises:

a pair of opposed leaf springs each connected in an opposing manner to an associated leg, each leaf spring being crimped in a plurality of locations such that the opposing leaf springs define a plurality of spaced apart, openings parallel to a hour string which removably retain said bow string therewithin.

4. The bow square of claim 3 which further comprises:

means for detachably engaging located proximate the terminus of each leg.

5. The bow square of claim 1 wherein: the gauge further comprises:

(a) a first plate which is tangential to a first side of said one leg, said plate terminating in a pointer;

(b) a second plate having a dimple therein, said plate being tangential to a second side of said leg which is in frictional engagement with said dimple; and (c) a fastening means interconnecting said first and second plates, such that said gauge is slidingly positionable and retained in place by frictional engagement between said dimple and said leg.

6. The bow square of claim 3 wherein:

the spaced apart openings parallel to the bow string are formed by alternating concave and convex shaping of said opposed leaf springs.

* * * * *